United States Patent
Christianson et al.

(10) Patent No.: US 10,048,370 B2
(45) Date of Patent: Aug. 14, 2018

(54) ESTIMATING WEATHER AND GROUND REFLECTIVITY WITH DOPPLER SPECTRAL INFORMATION

(71) Applicant: Honeywell International Inc., Morristown, NJ (US)

(72) Inventors: Paul E. Christianson, Seattle, WA (US); Robert J. Jensen, Renton, WA (US)

(73) Assignee: Honeywell International Inc., Morris Plains, NJ (US)

( * ) Notice: Subject to any disclaimer, the term of this patent is extended or adjusted under 35 U.S.C. 154(b) by 429 days.

(21) Appl. No.: 14/793,546

(22) Filed: Jul. 7, 2015

(65) Prior Publication Data
US 2017/0010355 A1   Jan. 12, 2017

(51) Int. Cl.
*G01S 13/95*   (2006.01)
*G01S 7/41*   (2006.01)
*G01S 13/524*   (2006.01)

(52) U.S. Cl.
CPC .......... *G01S 13/953* (2013.01); *G01S 7/415* (2013.01); *G01S 13/5244* (2013.01); *Y02A 90/18* (2018.01)

(58) Field of Classification Search
CPC ........ G01S 13/95; G01S 13/953; G01S 7/415; G01S 13/524; G01S 7/292; G01S 13/50; G01S 13/52; G01S 13/5244
USPC ...................................................... 342/26 R
See application file for complete search history.

(56) References Cited

U.S. PATENT DOCUMENTS

| | | | | |
|---|---|---|---|---|
| 4,375,640 A | * | 3/1983 | Harvey | G01S 13/5248 342/160 |
| 4,459,592 A | * | 7/1984 | Long | G01S 13/524 342/160 |
| 4,684,950 A | * | 8/1987 | Long | G01S 13/524 342/159 |
| 4,930,513 A | | 6/1990 | Mayo et al. | |
| 4,987,419 A | | 1/1991 | Salkeld | |

(Continued)

FOREIGN PATENT DOCUMENTS

EP   2508913 A1   10/2012

OTHER PUBLICATIONS

Barton, "Radar today," Journal of Electronic Defense, vol. 28, No. 3, Horizon House Publications, Inc., Mar. 2005, 6 pp.

(Continued)

*Primary Examiner* — Peter M Bythrow
(74) *Attorney, Agent, or Firm* — Shumaker & Sieffert, P.A.

(57) ABSTRACT

Systems, methods, and devices for processing a radar return signal to estimate reflectivity values. An example weather radar system includes one or more antennas configured to transmit a radar signal generated by a transmitter and deliver a radar return signal to a receiver. The example weather radar system further includes one or more processors configured to sample the radar return signal, determine a first signal power measurement of the sampled radar return signal based on Doppler signal processing, determine a quality of the first signal power measurement, and estimate reflectivity values of the sampled radar return signal based on the first signal power measurement when the quality is above a threshold. The example weather radar system further includes memory configured to store the estimated reflectivity values.

18 Claims, 7 Drawing Sheets

(56) References Cited

U.S. PATENT DOCUMENTS

| | | | |
|---|---|---|---|
| 5,166,688 A * | 11/1992 | Moreira | G01S 13/90 |
| | | | 342/195 |
| 5,262,782 A | 11/1993 | Rubin et al. | |
| 5,568,151 A | 10/1996 | Merritt | |
| 5,831,570 A | 11/1998 | Ammar et al. | |
| 6,307,500 B1 | 10/2001 | Cornman et al. | |
| 6,707,415 B1 | 3/2004 | Christianson | |
| 6,720,910 B2 | 4/2004 | Yu | |
| 7,421,377 B2 | 9/2008 | Zhang | |
| 7,652,614 B2 * | 1/2010 | Venkatachalam | G01S 7/292 |
| | | | 342/159 |
| 7,911,375 B2 | 3/2011 | Winstead et al. | |
| 8,009,080 B2 | 8/2011 | Mizutani et al. | |
| 8,188,906 B2 | 5/2012 | Mizutani et al. | |
| 8,319,679 B2 | 11/2012 | Christianson | |
| 8,633,850 B2 | 1/2014 | Yu | |
| 2003/0001770 A1 * | 1/2003 | Cornell | G01S 7/20 |
| | | | 342/26 R |
| 2004/0041725 A1 | 3/2004 | Matsuda et al. | |
| 2010/0176984 A1 * | 7/2010 | Kemkemian | G01S 7/2927 |
| | | | 342/159 |
| 2012/0249365 A1 * | 10/2012 | Christianson | G01S 7/414 |
| | | | 342/26 B |
| 2013/0201054 A1 * | 8/2013 | Wang | G01S 13/0218 |
| | | | 342/93 |
| 2014/0333475 A1 * | 11/2014 | Sierwald | G01S 13/95 |
| | | | 342/26 R |

OTHER PUBLICATIONS

"RDR-4000 IntuVue™ 3D Weather Radar," Honeywell International Inc., MyAerospace, Product Catalog, accessed on Jul. 7, 2015, 1 pp.

Cao, et al., "A New Identification and Mitigation Algorithm for Second Trip Contamination," 2011 IEEE, May 23, 2011, pp. 729-733.

Golestani et al., "Dual Polarized Staggered PRT Scheme for Weather Radars: Analysis and Applications," IEEE Transactions on Geoscience and Remote Sensing, vol. 33, No. 2, Mar. 1995, pp. 239-246.

Extended European Search Report from counterpart European Application No. 16175127.6, dated Nov. 18, 2016, 10 pp.

Response to the Extended European Search Report and Opinion dated Nov. 18, 2016, from counterpart European Application No. 16175127.6, filed on Feb. 15, 2017, 15 pp.

Intent to Grant from counterpart EP Application No. 16175127.6, dated May 31, 2018, 40 pp.

* cited by examiner

ESTIMATING WEATHER AND GROUND REFLECTIVITY WITH DOPPLER SPECTRAL INFORMATION

This disclosure relates to radar systems, and in particular, weather radar systems.

BACKGROUND

An aircraft radar system may transmit a radar signal and receive a radar return signal that may be measured and converted to reflectivity values, and stored in a three-dimensional (3-D) weather volumetric buffer relative to the range associated with the radar return signal. The 3-D weather volumetric buffer may be a data structure stored in memory that includes data that describes a distribution of reflectivity within a three-dimensional space. For example, one or more processors of the aircraft radar system may use non-Doppler processing to measure the signal power of radar return signals, estimate reflectivity values based on the signal power measurements, and populate elements of the 3-D weather volumetric buffer with the estimated reflectivity values. However, ground clutter contamination of a desired weather signal occurs when estimating reflectivity values based on the signal power measurements from non-Doppler processing.

SUMMARY

This disclosure is directed to systems, methods, and devices for incorporation of Doppler spectral information into the processing of radar signals to estimate reflectivity values, and in some examples, separately resolving at least one of weather reflectivity values or ground reflectivity values. According to techniques described herein, even though a radar antenna illuminates both ground and weather with a transmitted radar signal, analysis of Doppler spectral information of the radar return signal may be performed to provide a means of separately measuring (e.g., ground and weather signal power components) the signal power scattered by stationary targets (e.g., ground) and moving targets (e.g., weather). Additionally or alternatively, according to techniques described herein, Doppler spectral information and signal power measurements may be analyzed to provide a means of determining a quality of the Doppler spectral information extracted from the radar return signal. For example, ground and weather signal power components of a first signal power measurement from the analysis of Doppler spectral information may be compared to other signal power measurements that are not subject to limitations inherent to Doppler processing to determine whether the Doppler-processed signals should be rejected. In this example, when the Doppler-processed signal are rejected, the alternate or secondary (non-Doppler) processed signal power measurement may be used instead in the reflectivity update process. Typical transmit signal waveforms that enable Doppler spectral processing are subject to signal contamination due to multiple-time-around-echo (MTAE), and unavailability of signal return due to transmit signal eclipsing.

One example is directed to a weather radar system. The system comprising one or more antennas, one or more processors, and memory. The one or more antennas are configured to transmit a radar signal generated by a transmitter, and deliver a radar return signal of the transmitted radar signal to a receiver. The one or more processors are configured to sample the radar return signal at a periodic sample rate, wherein timing of the periodic sample rate following transmission of the radar signal corresponds to a range bin, determine a first signal power measurement of the sampled radar return signal of the first range bin based on Doppler signal processing, wherein the first signal power measurement comprises at least one of a ground signal power component or a weather signal power component, determine a quality of the first signal power measurement, and estimate reflectivity values of the sampled radar return signal of the first range bin based on the first signal power measurement when the quality is above a threshold. The memory is configured to store the estimated reflectivity values.

In another example, a method includes transmitting, by one or more antennas, a radar signal generated by a transmitter. The method further includes delivering, by the one or more antennas, a radar return signal of the transmitted radar signal to a receiver. The method further includes sampling, by one or more processors, the radar return signal at a periodic sample rate, wherein timing of the periodic sample rate following transmission of the radar signal corresponds to a range bin. The method further includes determining, by the one or more processors, a first signal power measurement of the sampled radar return signal of a first range bin based on Doppler signal processing, wherein the first signal power measurement comprises at least one of a ground signal power component or a weather signal power component. The method further includes determining, by the one or more processors, a quality of the first signal power measurement. The method further includes estimating, by the one or more processors, reflectivity values of the sampled radar return signal of the first range bin based on the first signal power measurement when the quality is above a threshold.

Another example is directed to a device comprising a computer-readable medium having program code stored thereon, the device configured for the program code to be executable by one or more processors for causing the one or more processors to sample a radar return signal at a periodic sample rate, wherein timing of the periodic sample rate following transmission of the radar signal corresponds to a range bin. The program code is further executable by one or more processors for causing the one or more processors to determine a first signal power measurement of the sampled radar return signal of the first range bin based on Doppler signal processing, wherein the first signal power measurement comprises at least one of a ground signal power component or a weather signal power component. The program code is further executable by one or more processors for causing the one or more processors to determine a quality of the first signal power measurement. The program code is further executable by one or more processors for causing the one or more processors to estimate reflectivity values of the sampled radar return signal of the first range bin based on the first signal power measurement when the quality is above a threshold.

The disclosure is also directed to an article of manufacture comprising a computer-readable storage medium. The computer-readable storage medium comprises computer-readable instructions that are executable by a processor. The instructions cause the processor to perform any part of the techniques described herein. The instructions may be, for example, software instructions, such as those used to define a software or computer program. The computer-readable medium may be a computer-readable storage medium such as a storage device (e.g., a disk drive, or an optical drive), memory (e.g., a Flash memory, read only memory (ROM), or random access memory (RAM)) or any other type of volatile or non-volatile memory or storage element that stores instructions (e.g., in the form of a computer program or other executable) to cause a processor to perform the techniques described herein. The computer-readable medium may be a non-transitory storage medium.

The details of one or more examples are set forth in the accompanying drawings and the description below. Other features, objects, and advantages will be apparent from the description and drawings, and from the claims.

DETAILED DESCRIPTION

Figure 1:
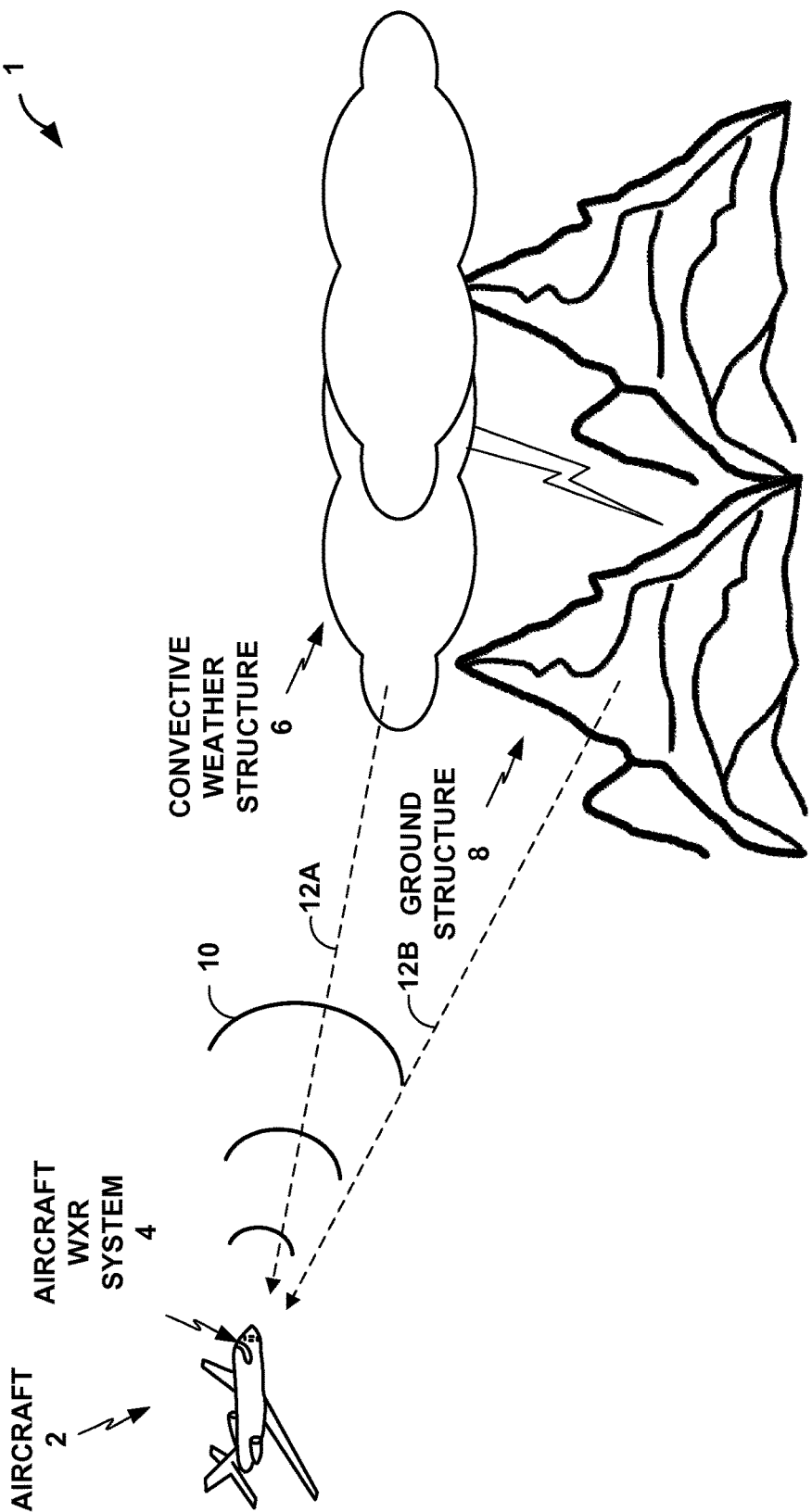
FIG. 1 is a conceptual diagram of an example system illustrating a weather radar system onboard an aircraft configured to transmit a radar signal and receive a radar return signal, in accordance with various aspects of this disclosure.

Weather radar processing techniques, systems, devices, and methods of this disclosure may process Doppler spectral information from aircraft weather radar systems to determine a first signal power measurement that includes separate weather and ground signal power components, quality check the first signal power measurement, and estimate reflectivity values based on the separate weather and ground signal power components if the quality is above a threshold. Additionally, in some examples, weather radar processing techniques, systems, devices, and methods of this disclosure may use a non-Doppler process with aircraft weather radar systems to determine a second signal power measurement when the quality of the first signal power measurement is below the threshold, and estimate reflectivity values based on the second signal power measurement. In this manner, processing Doppler spectral information when quality-checked may provide more accurate and fine-grained weather radar information than processing non-Doppler signal power measurements. For ease of understanding, various examples of techniques, systems, devices, and methods for processing Doppler spectral information from airborne weather radar systems are further described below. However, it is contemplated that the various examples of weather radar processing techniques, systems, devices, and methods of this disclosure may apply to ground-based radar systems and/or airborne weather radar systems.

Various aspects of non-Doppler processing of radar return signals to determine signal power measurements and estimate reflectivity values (e.g., weather and ground reflectivity values) are described in U.S. Pat. No. 6,707,415 (hereinafter "'415 patent") to Christianson, entitled "METHOD AND SYSTEM FOR DETERMINING WEATHER AND GROUND REFLECTIVITY INFORMATION," filed Dec. 20, 2002, the entire contents of which is incorporated by reference herein.

For example, the '415 patent describes a method of estimating the three-dimensional distribution of radar reflectivity of weather and the distribution of reflectivity of the ground even though the radar receives signals from both weather and ground simultaneously. To separate the weather reflectivity from the ground reflectivity, the method uses numerous measurements of received signal power as the radar antenna is swept through the volume in the vicinity of the radar system to iteratively estimate the reflectivity environment ahead of the aircraft. Using antenna beam characteristics and the non-Doppler signal power measurement process, the radar system may determine estimates of the distribution of weather and ground signal scattering elements that explain these signal power measurements and stores these reflectivity values in memory.

In some examples, there may be physical limitations on the ability of the radar system as described in the '415 patent to separate weather and ground sources of received signal power. For example, weather that is not sufficiently separate in angle from ground may not be sufficiently resolvable by the radar system as distinct from ground. The angular resolution performance of the radar system is dependent on the operating frequency of the system and the size of the radar antenna. In some examples, a distant significant storm reflectivity may be separate from ground by a certain altitude separation distance and the separation distance may be translated to angular separation using the range to the weather target (i.e., the distant significant storm reflectivity). In some examples, however, when the angular separation is too small for the angular resolution capability provided by the antenna, the processing as described in the '415 patent may have difficulty displaying some weather as distinct from the ground. In these examples, as the distance to the weather decreases (e.g., the aircraft is flying toward the weather), the angular separation of the weather from the ground increases, and the weather may begin to be angularly resolvable.

Compared to existing techniques, the techniques described herein may increase the distance from which a weather radar system can separately resolve weather from ground. For example, a weather radar system implementing the techniques of this disclosure may separately resolve weather from ground at a distance of up to three-hundred and twenty nautical miles or more. Utilizing the techniques of this disclosure, an aircraft approaching a storm may have an increase in warning time because of the increased distance. In this example, the aircraft may potentially perform additional preparations because of the increase in warning time, including but not limited to, avoidance of the storm.

The radar antenna in use by some aircraft may be relatively large. For instance, a large airborne antenna may have a diameter of thirty inches or more. The angular resolution performance of the relatively large airborne antenna may permit timely warning of storms along the flight path. In some examples, the radar antenna in use by ground-based system may also be relatively large (e.g., a large ground-based antenna may have a diameter of greater than thirty inches). The techniques of this disclosure, however, may enable another aircraft or ground-based system to utilize a relatively smaller antenna compared to the relatively large antennas currently used.

The use of a small antenna increases the beam width and may have the undesirable effect of reducing the warning time for the aircraft. In some examples, the techniques as described herein may enable a weather radar system with a relatively small antenna to determine three-dimensional weather reflectivity in a manner such that weather is distinguished from ground at greater ranges and increased warning times. In these examples, the techniques as described herein may also enable a weather radar system with a small antenna to have similar performance to a weather radar system with a larger antenna. Although the techniques described herein may be particularly advantageous to weather radar systems that utilize small antennas, the techniques of this disclosure are not limited to weather radar systems with small antennas and may in fact be used with antennas of any size.

FIG. 1 is a conceptual diagram of an example system illustrating weather radar system 4 onboard aircraft 2 configured to transmit radar signal 10 and receive radar return signal 12A, 12B (collectively "radar return signal 12"), in accordance with various aspects of this disclosure. Weather radar system 4 is configured to separately resolve weather reflectivity values of convective weather structure 6 and ground reflectivity values of ground structure 8 from radar return signal 12. Aircraft 2 may be a commercial airliner equipped with onboard aircraft weather radar system 4 (hereinafter "aircraft WXR system 4") that is configured to transmit radar signal 10 and receive radar return signal 12 of radar signal 10 that has deflected off of structures (e.g., convective weather structure 6 and/or ground structure 8) at a distance associated with a range bin. After a pulse transmission, aircraft WXR system 4 may sample radar return signal 12 at some periodic sample rate, where the sample time following transmission of radar signal 10 corresponds to a range from the radar, and each sample bin may be referred to as a "range bin."

In some examples, radar signal 10 may include a waveform and a plurality of coherent pulses, where the plurality of coherent pulses may enable Doppler processing of radar return signal 12. In this example, radar return signal 12 including the plurality of coherent pulses of radar signal 10 may be processed using Doppler processing by aircraft WXR system 4 to determine a first signal power measurement of radar return signal 12. Additionally, in this example, radar return signal 12 may also include the waveform of radar signal 10 that may be processed using non-Doppler processing by aircraft WXR system 4 to determine a second signal power measurement of radar return signal 12.

For example, aircraft WXR system 4 may use the Doppler spectral information in the Doppler processing of radar return signal 12 to estimate weather reflectivity values associated with convective weather structure 6 and ground reflectivity values associated with ground structure 8. In some examples, aircraft WXR system 4 may perform an analysis of Doppler spectra of radar return signal 12 to provide a separate estimation of the signal power scattered by stationary ground targets (e.g., ground structure 8) and the signal power scattered by moving targets such as weather (e.g., convective weather structure 6) even though the radar antenna of aircraft WXR system 4 may illuminate both ground and weather. In these examples, the estimated power scattered by weather and ground targets, respectively, may then be used by aircraft WXR system 4 to separately resolve weather and ground signal power components of a first signal power measurement. In these examples, aircraft WXR system 4 may also separately resolve weather and ground signal components when resolving the difference angularly is not practical, i.e., when the angular separation is not sufficient. In other words, the analysis of Doppler spectra may increase the ability of aircraft WXR system 4 to further distinguish weather from ground. In this way, aircraft WXR system 4 may then present weather for display on a display device at an increased range.

Aircraft WXR system 4 may transmit radar signal 10, where radar signal 10 enables the extraction of signal components in Doppler frequency from radar return signal 12, i.e., to enable extraction of Doppler spectral information. For example, aircraft WXR system 4 may transmit radar signal 10, which includes a series of pulses at the same carrier frequency and with a fixed period (i.e., pulse repetition interval or PRI) between the pulses. In some examples, aircraft WXR system 4 may use long PRIs to allow signals (e.g., radar return signal 12) to return from the longer ranges. In these examples, longer PRIs may cause significant aliasing in the Doppler frequency domain, which may make the processing by aircraft WXR system 4 of radar return signal 12 to adequately separate stationary ground and moving target signal power components more difficult or insufficient. For example, aircraft 2 may have a small radar antenna scanning well away from the velocity vector and traveling at a high ground speed. In this example, high Doppler gradients across the antenna beam may cause spreading of signal power components in Doppler frequency, which may cause difficulties in the mixing and separation of signal power components of radar return signal 12.

Reducing the PRI between the pulses of radar signal 10 may increase the unaliased bandwidth and improve the ability of aircraft WXR system 4 to analyze the Doppler spectra. However, reducing the PRI between the pulses of radar signal 10 may also cause the longer ranges to fall beyond a first receive interval. Aircraft WXR system 4 may use phase coding in order to receive coherent data from beyond the first receive interval. For example, aircraft WXR system 4 may utilize previously known phase information of each pulse in the pulse train of radar signal 10 to make any desired interval coherent, while making the return of radar signal 10 from other intervals incoherent. However, reducing the PRI may result in more ranges being eclipsed (i.e., the received signal occurs during transmit time for a subsequent pulse, and so cannot be received).

Additionally, a reduced PRI may also increase an amount of multiple-time-around echo (MTAE) power associated with radar return signal 12. For example, aircraft WXR system 4 may phase code radar signal 10 to allow aircraft WXR system 4 to receive radar return signal 12 from multiple intervals. The total return (e.g., MTAE power) from all other intervals may be a source of interference for the detection of radar return signal 12 from the desired interval. In some examples, aircraft WXR system 4 may determine that the MTAE power causes too much interference to detect the desired radar return signal 12. In these examples, aircraft WXR system 4 may compare the first signal power measurement based on the Doppler spectral information to an alternate or secondary signal power measurement that is uncontaminated by MTAE. For example, aircraft WXR system 4 may use the separate signal power components obtained from Doppler spectral information to estimate and update the reflectivity values of weather and/or ground elements when the sum of the processed signal components is in sufficient agreement with the second signal power measurement (e.g., when the quality of the first signal power measurement is above a threshold). Conversely, aircraft WXR system 4 may disregard the Doppler spectral information and the first signal power measurement, and instead use the second signal power measurement to estimate the reflectivity values of weather and ground elements when the sum of Doppler-processed signal power components does not sufficiently agree with the second signal power measurement (e.g., when the quality is below a threshold). Additionally or alternatively, in some examples, aircraft WXR system 4 may use any possible combination of first signal power measurement along with the second signal power measurement to estimate the reflectivity values of weather and/or ground elements.

In other words, aircraft WXR system 4 may use the analysis of Doppler spectra to extract ground and weather signal components from radar return signal 12 to improve estimation of the three-dimensional distribution of reflectivity for weather and/or ground. The analysis of Doppler spectra of radar return signal 12 by aircraft WXR system 4 may be further improved by using radar signal 10 with a relatively short PRI. To reduce the effects caused by radar signal 10 with a short PRI, aircraft WXR system 4 may use data from both Doppler spectral analysis and the second signal power measurement resulting from pulses that provide full range coverage. In some examples, aircraft WXR system 4 may also determine the second signal power measurement from one or more of individual pulses used only for power measurements. For example, aircraft WXR system 4 may determine the second signal power measurement from the first pulse of a pulse train used for Doppler processing, which is not contaminated by MTAE.

In this way, aircraft WXR system 4 may use the pulses of radar return signal 12 for determining the first and/or second signal power measurements. Additionally, the pulses of radar return signal 12 used by aircraft WXR system 4 to determine second signal power measurement provides full range coverage and are not subject to interference from MTAE. Additionally, the waveform of radar return signal 12 may also be used by aircraft WXR system 4 to determine the second signal power measurement and is not subject to interference from MTAE. Additionally or alternatively, the second signal power measurement from radar return signal 12 may also be used by aircraft WXR system 4 to cross-check the Doppler-derived first signal power measurement for signal power quality control.

Specifically, in some examples, aircraft WXR system 4 may analyze Doppler spectral information, which may result in determination of at least one of ground signal power, weather signal power, receiver noise power, or MTAE power. Comparatively, in some examples, aircraft WXR system 4 may use the second signal power measurement to represent the sum of ground signal power, weather signal power, and receiver noise power.

In some examples, aircraft WXR system 4 may determine whether the Doppler analyzed signal power components are sufficient quality to be used in determining reflectivity values. For example, the sum of Doppler analyzed signal power components may be in sufficient agreement with the second signal power measurement from non-Doppler processing (e.g., above a quality threshold). In other examples, the sum of Doppler analyzed signal power components may be in disagreement with the second signal power measurement (e.g., when the Doppler analyzed signal power components are contaminated by an amount of MTAE power above a threshold and below a quality threshold). In these examples, aircraft WXR system 4 may then use the second signal power measurement that is uncontaminated by MTAE power instead of the first signal power measurement from the Doppler spectral information to prevent the use of poor quality Doppler processing in estimating reflectivity values.

In other examples, the Doppler analyzed signal power components may be found to be insufficient quality by aircraft WXR system 4 when the Doppler analyzed signal components are at least partially eclipsed. In other words, if the Doppler-derived first signal power measurement is rejected by aircraft WXR system 4 or if the range is eclipsed, the second signal power measurement may be used by aircraft WXR system 4 to update the stored reflectivity values. However, if the ground and/or weather signal power components of the first signal power measurement available from Doppler spectral analysis are above a quality threshold (e.g., the contamination by MTAE power of the first signal power measurement is below a threshold and the first signal power measurement is not eclipsed), the ground and/or weather signal power components may be used by aircraft WXR system 4 to preferentially update ground reflectivity elements and/or weather reflectivity elements depending on which signal power components are available.

Figure 2:
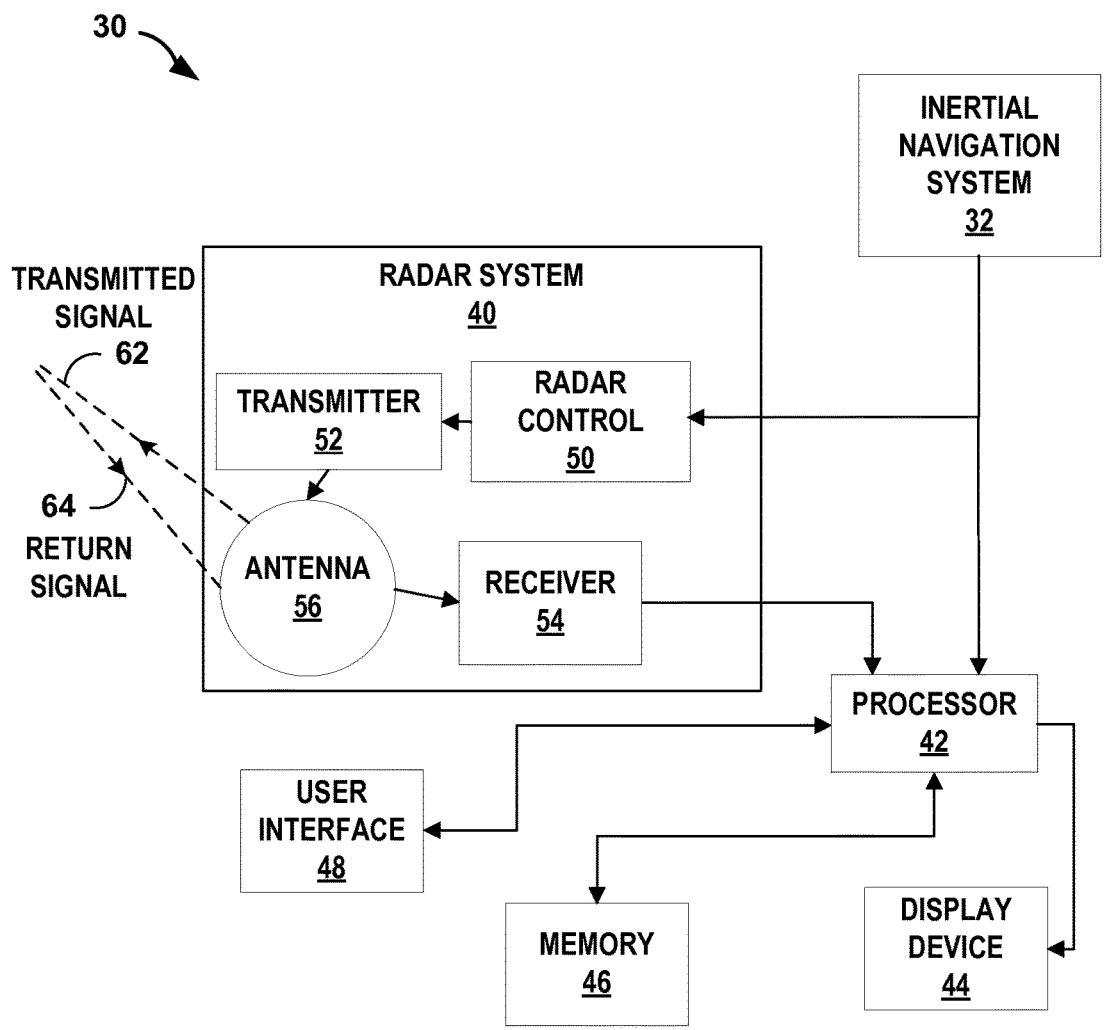
FIG. 2 is a block diagram illustrating an example system onboard an aircraft, in accordance with various aspects of this disclosure.

FIG. 2 is a block diagram illustrating an example weather radar system 30 onboard an aircraft, in accordance with various aspects of this disclosure. Weather radar system 30 may be configured to separately resolve weather reflectivity values associated with a convective weather structure and ground reflectivity values associated with a ground structure. FIG. 2 is described with reference to FIG. 1. In the example of FIG. 2, weather radar system 30 includes radar system 40, processor 42, display device 44, memory 46, inertial navigation system (INS) 32, and user interface 48. Processor 42 is communicatively coupled to radar system 40, display device 44, INS 32, memory 46, and user interface 48. In some examples, weather radar system 30 may correspond to aircraft weather radar system 4 of aircraft 2 as described in FIG. 1. Additionally, for ease of understanding, radar system 40 has been described separate from processor 42, however, it is appreciated that processor 42 and/or other processor(s) may be included in radar system 40 or may control any portion of radar system 40. In other words, processor 42 is described separately from radar system 40 to emphasize that any processor or processors onboard aircraft 2, including but not limited to the processors of radar system 40, may perform the functions attributed to processor 42.

Radar system 40 includes radar control 50, transmitter 52, receiver 54, and antenna 56. Radar system 40 includes any number of processors (not shown) required to perform the functions attributed to radar system 40. Radar control 50 controls transmitter 52 to transmit radar signal 62 that includes a waveform and a plurality of coherent pulses. Radar control 50 also controls receiver 54 to receive radar return signal 64 via antenna 56 based on aircraft data (e.g., position, heading, roll, yaw, pitch, etc.) received from INS 32 or any other aircraft system capable of providing aircraft data.

Radar system 40 receives radar return signal 64 from the scattering of transmitted radar signal 62 from the external environment including weather and terrain, which is delivered to and outputted by receiver 54 in a range bin to processor 42. In some examples, processor 42 may receive radar return signal 64 in a range bin and determine the signal power measurement of radar return signal 64 based on the waveform of radar return signal 64. In some examples, processor 42 may receive radar return signal 64 in the range bin and determine Doppler spectral information based on the plurality of coherent pulses. In some examples, processor 42 may process the power signal measurement to estimate reflectivity values for ground and/or weather elements. In other examples, processor 42 may process the Doppler spectral information to estimate a signal power. In these examples, processor 42 may process the first signal power measurement to estimate reflectivity values for ground and/or weather elements.

Processor 42 may update estimates of weather reflectivity and ground normalized radar cross section contained in memory 46 (e.g., three-dimensional (3-D) volumetric buffer) with the estimated reflectivity values. Processor 42 may generate an image for presentation on display device 44 based on data stored in the 3-D volumetric buffer in memory 46.

In some examples, at the startup of weather radar system 30, all elements of atmosphere (e.g., a 3D buffer) and all elements of ground (e.g., a 2D buffer) may be initialized by processor 42. In some examples, processor 42 may initialize each element (i.e., each cell of a buffer) by choosing initial reflectivity values for weather reflectivity and ground reflectivity (i.e., normalized radar cross section or NRCS), and uncertainty parameters associated with each of the initial reflectivity values for the cells for both weather and ground. In these examples, the uncertainty value chosen by processor 42 may define the error in the initial reflectivity values for weather and ground reflectivity.

For example, processor 42 may initialize reflectivity values to zero, and initialize corresponding uncertainty parameters to relatively large values to indicate possibly large initial error in the reflectivity values. In some examples, processor 42 may initialize reflectivity values using additional information, such as uplinked weather reflectivities from ground-based radar. In these examples, processor 42 may initialize the corresponding uncertainty parameters to a lower value to indicate the reduced uncertainty in the initial reflectivities. In some examples, processor 42 may initialize the uncertainty parameters of ground elements (e.g., the normalized radar cross section) based on a type of ground associated with each of the ground elements.

In some examples, processor 42 may consider the range bin (e.g., the range increment associated with the range bin) of radar return signal 64 by determining with Doppler processing a first signal power measurement including weather and/or ground components, a quality of the first signal power measurement, and with non-Doppler processing a second signal power measurement. In these examples, processor 42 may calculate locations within the 3-D buffer that correspond to the range bin and the antenna pointing direction increments represented by the array of vectors used to model the antenna main beam.

Next, in some examples, processor 42 may retrieve any data stored in the calculated locations of the 3-D buffer and use the retrieved data to separately predict weather and ground signal power. In some examples, where the quality of the first signal power measurement may be above a threshold (e.g., in agreement with the second signal power measurement, low MTAE power contamination, and/or not eclipsed), processor 42 may subtract the separate prediction of weather or ground signal power from the corresponding weather or ground signal power component of the first signal power measurement of the first range bin and generate an innovation value. In some examples, processor 42 may calculate a gain (k) for each calculated buffer location and multiply the innovation value by the calculated gain value to estimate weather or ground reflectivity values for each calculated buffer location. In some examples, after estimating the weather or ground reflectivity values, processor 42 may update the uncertainty parameter for each calculated buffer location.

Additionally or alternatively, in some examples, processor 42 may retrieve any data stored in the calculated locations of the 3-D buffer and use the retrieved data to predict the combined weather and ground signal power. In some examples, where the quality of the first signal power measurement may be below a threshold (e.g., in disagreement with the second signal power measurement, high MTAE power contamination, and/or eclipsed), processor 42 may subtract the combined prediction of weather and ground signal power from the second signal power measurement of the first range bin and generate an innovation value. In some examples, processor 42 may calculate a gain (k) for each calculated buffer location and multiply the innovation value by the calculated gain value to estimate weather and ground reflectivity values for each calculated buffer location.

In some examples, after estimating the weather and/or ground reflectivity values, processor 42 may update the uncertainty parameter for each calculated buffer location. In some examples, if the present range bin is not the last range bin in the present radial, processor 42 may continue on to the next range bin of the received radar return signal. In some examples, once the next range bin value has been retrieved, processor 42 may continue processing the radar return signal until the reflectivity values for the last range bin value have been determined. When the reflectivity values for the last range bin value have been determined, weather radar system 30 may adjust antenna 56 to have the next antenna pointing angle, and perform the techniques described herein on the next radar return signal from a transmitted radar signal at the next pointing angle.

In some examples, processor 42 may determine a quality of the first signal power measurement from Doppler processing to ensure the use of acceptable weather and/or ground signal power component values from the spectral processing. In these examples, processor 42 may determine the quality of the first signal power measurement to be in sufficient agreement when $S_{wx}+S_{gnd}$ is approximately equal to $S_{meas}$. When processor 42 determines there is sufficient agreement, processor 42 may then separately estimate the weather buffer elements using $S_{wx}$, and the ground buffer elements using $S_{gnd}$. For example, processor may use Equation 1A to separately estimate the weather reflectivity values to store in a three-dimensional storage location, and is defined as the following:

$$\hat{Z}_i = \bar{Z}_i + K_i\left(S_{wx} - \sum_j h_j \bar{Z}_j\right) \quad (1A)$$

According to Equation 1A, processor 42 may determine a residual signal by taking the difference between the signal power measurement $S_{wx}$ and the prediction of the signal power measurement $$\sum_j h_j \bar{Z}_j$$

to get an innovation value, where $\bar{Z}_i$ is the weather reflectivity estimate for the $i^{th}$ grid point before the first signal power measurement, $\hat{Z}_i$ is the weather reflectivity estimate after the first signal power measurement, $K_i$ is a filter gain to convert radar signal values into weather reflectivity values and modified to reflect a reduced, or eliminated, effect of ground NRCS on the $S_{wx}$ measurement, and $S_{wx}$ is the weather component of the first signal power measurement. Additionally, h is an element weight that depends upon radar beam shape and a weather element position relative to the radar beam shape.

In some examples, processor 42 may use Equation 1B for estimating the ground (e.g., NRCS) reflectivity values, and is defined as the following:

$$\hat{\sigma}_i^0 = \overline{\sigma_i^0} + K_i\left(S_{gnd} - \sum_k h_k \overline{\sigma_k^0}\right) \quad (1B)$$

According to Equation 1B, processor 42 may determine a residual signal by taking the difference between the signal power measurement $S_{gnd}$ and the prediction of the signal power measurement $$\sum_k h_k \overline{\sigma_k^0}$$

to get an innovation value, where $\overline{\sigma_i^0}$ is the ground reflectivity estimate for the $i^{th}$ grid point before the first signal power measurement, $\hat{\sigma}_i^0$ is the ground reflectivity estimate after the first signal power measurement, $K_i$ is a filter gain to convert radar signal values into ground reflectivity values and modified to reflect a reduced, or eliminated, effect of weather reflectivities on the $S_{gnd}$ measurement, and $S_{gnd}$ is the ground component of the first signal power measurement. Additionally, h is an element weight that depends upon radar beam shape and a ground element position relative to the radar beam shape. It is understood that the $K_i$ values are not the same between Equations 1A and 1B.

In some examples, processor 42 may also use Equation 3A to estimate the weather reflectivity values to store in a three-dimensional storage location, and is defined as the following:

$$\hat{Z}_i = \overline{Z}_i + K_i\left(S_{meas} - \left(\sum_j h_j \overline{Z}_j + \sum_k h_k \overline{\sigma_k^0}\right)\right) \quad (3A)$$

According to Equation 3A, processor 42 may determine a residual signal by taking the difference between the second signal power measurement $S_{meas}$ and the prediction of the signal power measurement $$\sum_j h_j \overline{Z}_j + \sum_k h_k \overline{\sigma_k^0}$$

to get an innovation value, where $\overline{Z}_i$ is the weather reflectivity estimate for the $i^{th}$ grid point before the second signal power measurement, $\hat{Z}_i$ is the weather reflectivity estimate after the second signal power measurement, $K_i$ is a filter gain to convert radar signal values into weather reflectivity values, and $S_{meas}$ is the second signal power measurement. Additionally, h is an element weight that depends upon radar beam shape and a weather element position relative to the radar beam shape.

In some examples, processor 42 may use Equation 3B for estimating the ground (e.g., NRCS) reflectivity values, and is defined as the following:

$$\hat{\sigma}_i^0 = \overline{\sigma_i^0} + K_i\left(S_{meas} - \left(\sum_j h_j \overline{Z}_j + \sum_k h_k \overline{\sigma_k^0}\right)\right) \quad (3B)$$

According to Equation 3B, processor 42 may determine a residual signal by taking the difference between the second signal power measurement $S_{meas}$ and the prediction of the signal power measurement $$\sum_j h_j \overline{Z}_j + \sum_k h_k \overline{\sigma_k^0}$$

to get an innovation value, where $\overline{\sigma_i^0}$ is the ground reflectivity estimate for the $i^{th}$ grid point before the second signal power measurement, $\hat{\sigma}_i^0$ is the ground reflectivity estimate after the second signal power measurement, $K_i$ is a filter gain to convert radar signal values into ground reflectivity values, and $S_{meas}$ is the second signal power measurement. Additionally, h is an element weight that depends upon radar beam shape and a weather element position relative to the radar beam shape. It is understood that the $K_i$ values are not the same between Equations 3A and 3B.

Figure 3A:
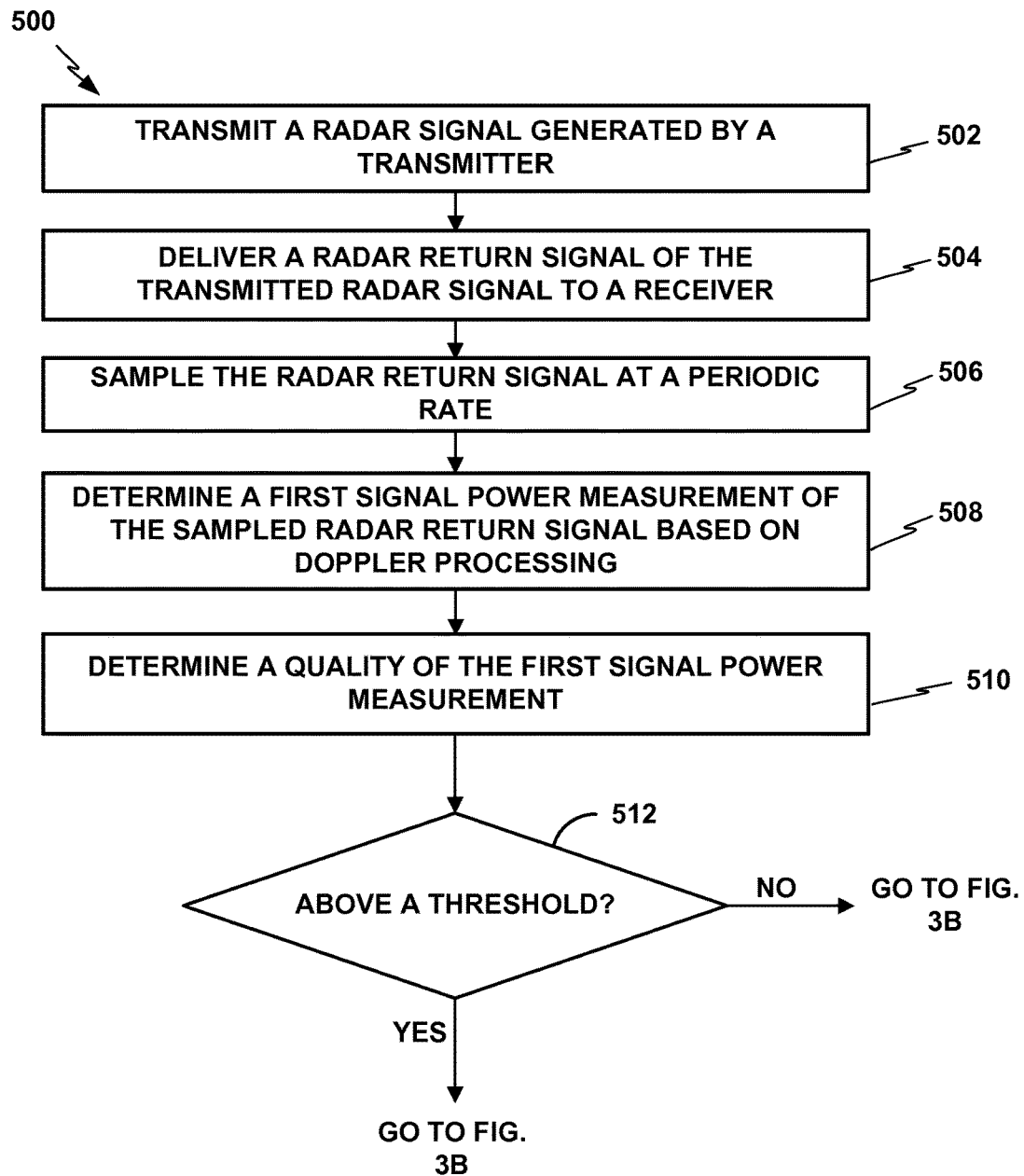
FIGS. 3A and 3B are flowcharts illustrating an example technique for estimating weather and/or ground reflectivity values, as may be implemented, performed, executed, and/or embodied by a weather radar system, in accordance with various aspects of this disclosure.
Figure 3B:
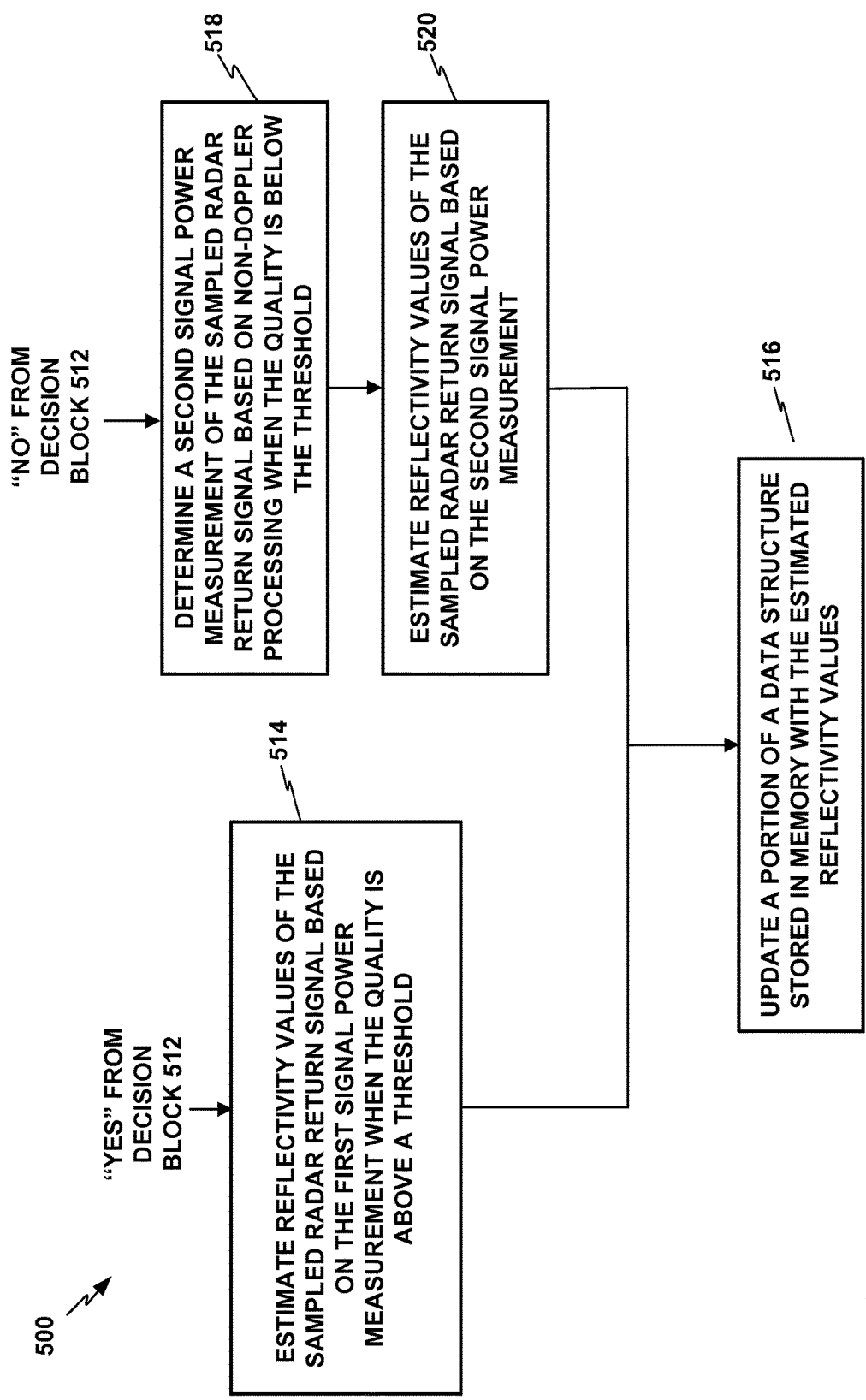

FIGS. 3A and 3B are flowcharts illustrating an example technique for estimating weather and/or ground reflectivity values, as may be implemented, performed, executed, and/or embodied by a weather radar system, in accordance with various aspects of this disclosure. FIGS. 3A and 3B are described with reference to FIGS. 1 and 2. In the example of FIG. 3A, technique 500 includes transmitting, by one or more antennas (e.g., antenna 56 as described in FIG. 2), radar signal 62 generated by transmitter 52, radar signal 62 comprising a waveform and a plurality of coherent pulses at a carrier frequency and with a fixed period between the plurality of coherent pulses (502). Technique 500 further includes delivering, by the one or more antennas, radar return signal 64 of the transmitted radar signal to receiver 54 (504). Technique 500 further includes sampling, by one or more processors (e.g., one or more processors 42 of weather radar system 30), the radar return signal at a periodic sample rate, and the timing of the periodic sample rate following transmission of the radar signal corresponds to a range bin (506). Technique 500 further includes determining, by the one or more processors, a first signal power measurement of the sampled radar return signal of a first range bin based on Doppler signal processing, and the first signal power measurement may include at least one of a weather signal power component or a ground signal power component (508). Technique 500 further includes determining, by one or more processors, a quality of the first signal power measurement (510). In some examples, determining the quality of the first signal power measurement may include determining, by the one or more processors, whether the sampled radar return signal of the first range bin is at least partially eclipsed. In some examples, determining the quality of the first signal power measurement may include determining, by the one or more processors, an amount of multiple-time-around echo (MTAE) contamination associated with the sampled radar return signal of the first range bin. Technique 500 further includes determining whether the quality of the first signal power measurement is above a threshold (decision block 512).

If the quality of the first signal power measurement is above a threshold ("YES" at decision block 512), then in the example of FIG. 3B, technique 500 further includes estimating, by the one or more processors, reflectivity values of the sampled radar return signal of the first range bin based on the first signal power measurement when the quality is above a threshold (514). In some examples, estimating reflectivity values of the sampled radar return signal may include separately estimating, by the one or more processors, ground reflectivity values based on the ground signal power component and weather reflectivity values based on the weather signal power component. Technique 500 further includes updating, by the one or more processors, a portion of a data structure stored in memory with the estimated reflectivity values (516). In some examples, the data structure may include a three-dimensional (3-D) volumetric buffer, and the 3-D volumetric buffer may define a distribution of reflectivities. In some examples, updating the portion of the data structure stored in memory with the estimated reflectivity values may include separately updating, by the one or more processors, the portion of the data structure with at least one of estimated ground reflectivity values or estimated weather reflectivity values.

If the quality of the first signal power measurement is below a threshold ("NO" at decision block 512), then in the example of FIG. 3B, technique 500 further includes determining, by the one or more processors, a second signal power measurement of the sampled radar return signal of the first range bin based on non-Doppler signal processing when the quality of the first signal power measurement is below the threshold (518). Technique 500 further includes estimating, by the one or more processors, reflectivity values of the sampled radar return signal of the first range bin based on the second signal power measurement (520). Technique 500 furthers include updating, by the one or more processors, a portion of a data structure stored in memory with the estimated reflectivity values based on the second signal power measurement (516). In some examples, the data structure may include a three-dimensional (3-D) volumetric buffer, and the 3-D volumetric buffer may define a distribution of reflectivities.

Some additional details of some examples are described below. In some examples, radar reflectivity data or values may be in an earth-referenced three-dimensional (or "volumetric") memory buffer (e.g., in one or more memory 46 in weather radar system 30). The memory buffer may include aircraft radar imaging data combined with sources of three-dimensional geographic and atmospheric data and sources of three-dimensional aircraft data on an aircraft's position, altitude, heading, and speed, for example. One or more processors (e.g., processor 42) onboard the aircraft may combine the three-dimensional radar imaging data, the geographic and atmospheric data, and the aircraft data. One or more processors may also load and/or store such data to the memory buffer and/or in other data storage (e.g., memory 46). Aircraft weather radar system 30 onboard aircraft 2 may be configured to scan the entire three-dimensional space in front of aircraft 2, and processors (e.g., processor 42) of aircraft weather radar system 30 may temporarily and/or permanently store the reflectivity data in the three-dimensional memory buffer. The one or more processors onboard aircraft 2 may periodically update the memory buffer with newly obtained weather radar data from processing a first signal power measurement based on Doppler spectral information when the quality of the first signal power measurement is above a threshold or a second signal power measurement when the quality of the first signal power measurement is below a threshold.

In some examples, weather radar system 30 may generate the weather radar output configured for a high-resolution display (e.g., display device 44) enabled for display of a three-dimensional (3D) view of the weather structure and the reflectivity range of each of its portions. This high-resolution display of the weather structure and/or ground structure may be enabled for a high resolution in time, such as a high frame rate. In addition, or instead, this high-resolution display of the weather structure and the reflectivity range of each of its portions may also be enabled for a high range (e.g., above a selected distance threshold). The high-resolution display of the weather structure and/or the ground structure, and the reflectivity range of its portions may contribute to the richness and resolution of the aircraft weather radar data provided to weather radar system 30.

Figure 4A:
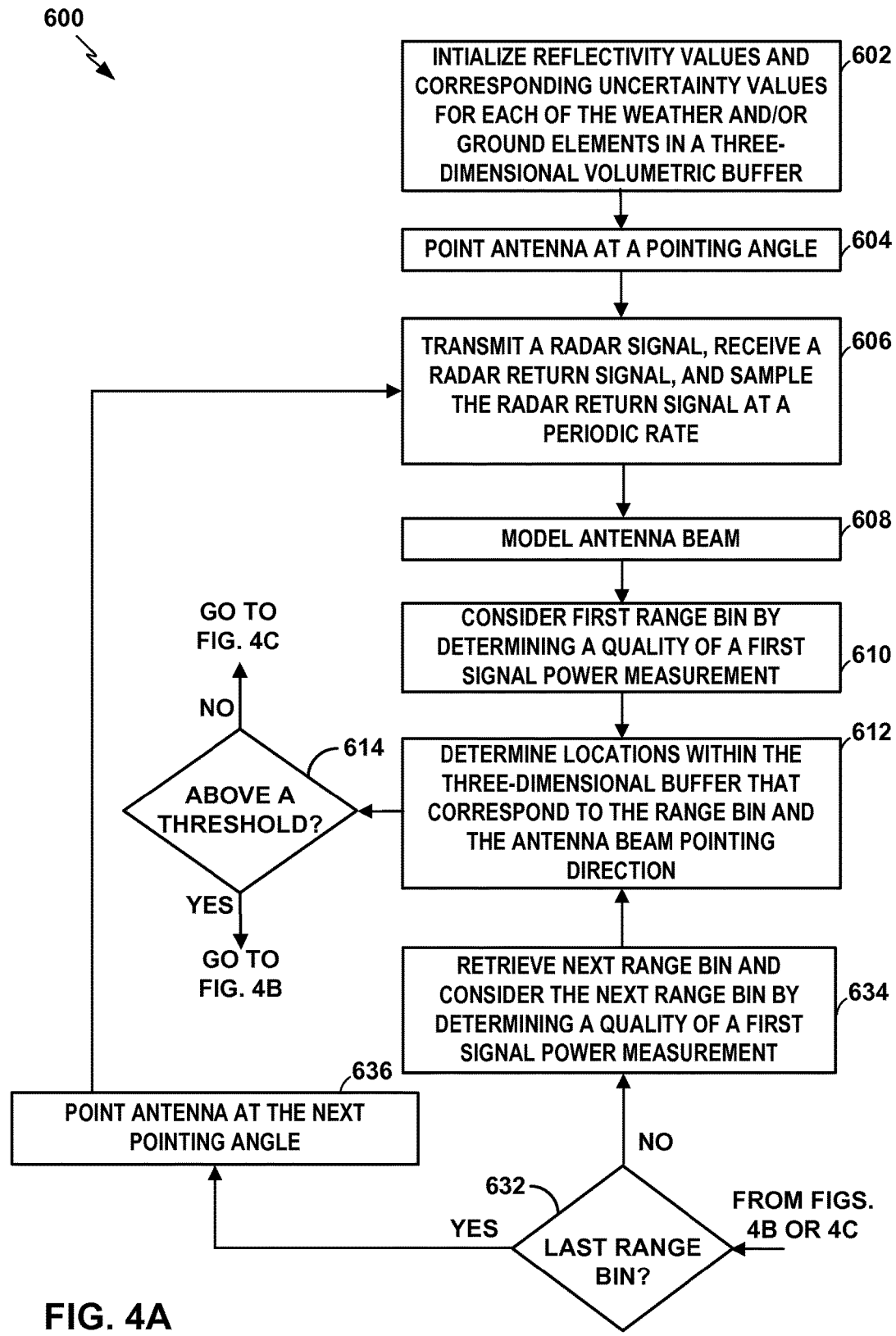
FIGS. 4A-4C are flowcharts illustrating another example technique for estimating weather and/or ground reflectivity values, as may be implemented, performed, executed, and/or embodied by a weather radar system, in accordance with various aspects of this disclosure.
Figure 4B:
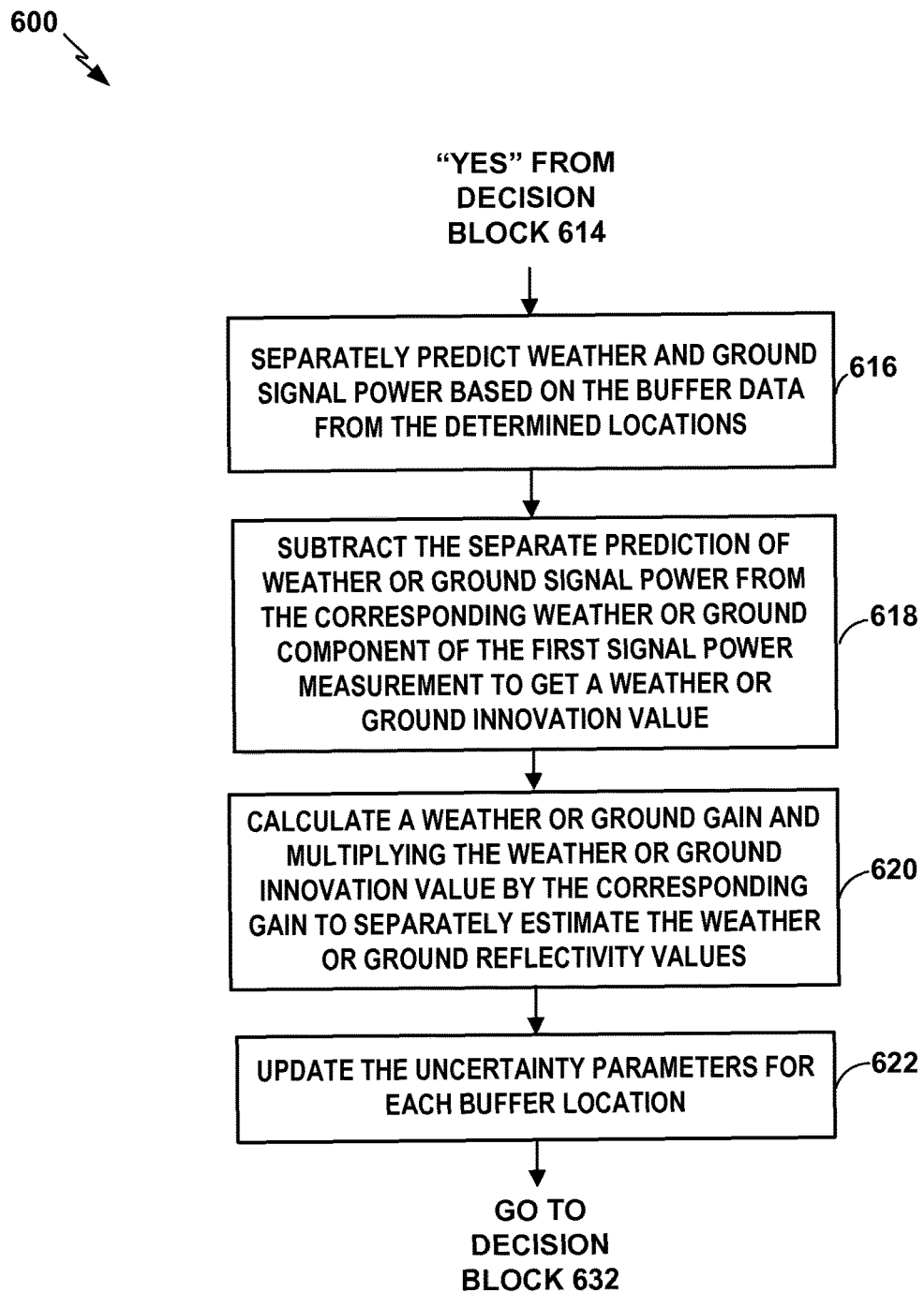
Figure 4C:
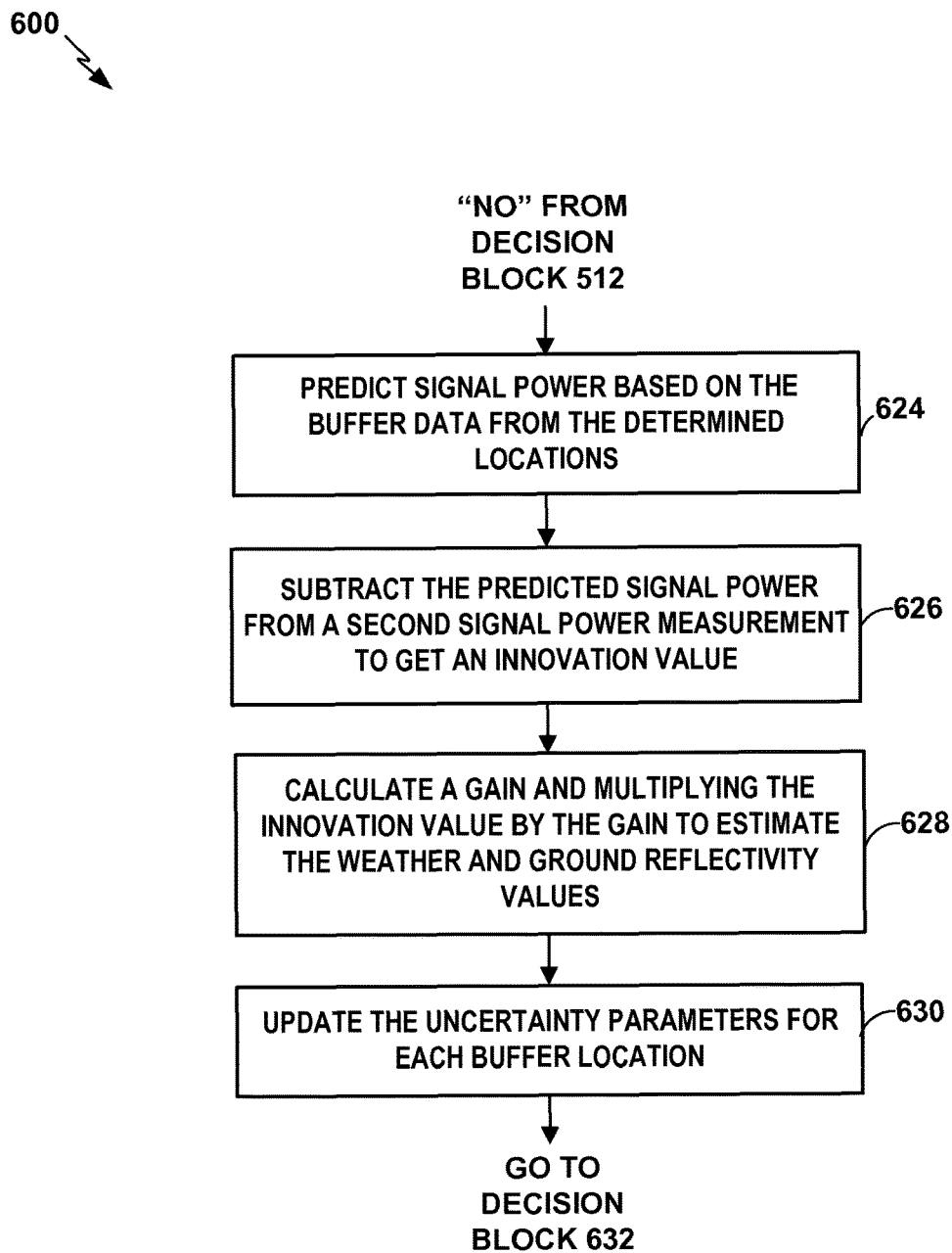

FIGS. 4A-4C are flowcharts illustrating another example technique for estimating weather and/or ground reflectivity values, as may be implemented, performed, executed, and/or embodied by a weather radar system, in accordance with various aspects of this disclosure. In the example of FIG. 4A, technique 600 includes initializing, by one or more processors (e.g., one or more processors 42 of weather radar system 30), reflectivity values and corresponding uncertainty values for each of the weather and/or ground elements in a three-dimensional volumetric buffer (602). Technique 600 further includes pointing, by the radar system (e.g., radar system 40 as described in FIG. 2), antenna 56 at a pointing angle (604). Technique 600 further includes transmitting, by the radar system, radar signal 62 comprising a waveform and a plurality of coherent pulses, receiving, by the radar system, radar return signal 64, and sampling, by one or more processors (e.g., one or more processors 42 as described in FIG. 2), radar return signal 64 at a periodic rate, the timing of the periodic rate following transmission of radar signal 62 corresponds to a range bin (606). Technique 600 further includes modeling, by the one or more processors, a beam of antenna 56 (608). Technique 600 further includes considering, by the one or more processors, a first range bin by at least one of determining a first signal power measurement based on Doppler processing of the first range bin, a second signal power measurement based on non-Doppler processing of the first range bin, and determining a quality of the first signal power measurement (610). Technique 600 further includes determining locations within the three-dimensional buffer that correspond to the range bin and the antenna beam pointing direction (612). Technique 600 further includes determining whether the quality of the first signal power measurement of a range bin (e.g., the first range bin) is above a threshold (614). If the quality of the first signal power measurement is above a threshold ("YES" at decision block 614), then technique 600 continues in FIG. 4B. If the quality of the first signal power measurement is below a threshold ("NO" at decision block 614), then technique 600 continues in FIG. 4C.

In the example of FIG. 4B, technique 600 further includes separately predicting, by the one or more processors, weather and ground signal power based on the buffer data from the determined locations of the three-dimensional volumetric buffer (616). Technique 600 further includes subtracting, by the one or more processors, the separate prediction of the weather or ground signal power from a corresponding weather or ground signal power component of the first signal power measurement based on Doppler processing to get a weather or ground innovation value (618). Technique 600 further includes calculating, by the one or more processors, a weather or ground gain and multiplying the weather or ground innovation value by the corresponding gain to separately estimate the weather or ground reflectivity values (620). Technique 600 further includes updating, by the one or more processors, the uncertainty parameters for each buffer location (622). After updating the uncertainty parameters, technique 600 continues with decision block 632 of FIG. 4A.

In the example of FIG. 4C, predicting, by the one or more processors, signal power based on the buffer data from the determined locations of the three-dimensional volumetric buffer (624). Technique 600 further includes subtracting, by the one or more processors, the predicted signal power from the second signal power measurement based on non-Doppler processing to get an innovation value (626). Technique 600 further includes calculating, by the one or more processors, a gain and multiplying the innovation value by the gain to estimate the weather and ground reflectivity values (628). Technique 600 further includes updating, by the one or more processors, the uncertainty parameters for each buffer location (630). In some examples, updating the uncertainty parameters (630) in FIG. 4C may be similar to updating the uncertainty parameters (622) in FIG. 4B. In other examples, updating the uncertainty parameters (630) in FIG. 4C may not be similar to updating the uncertainty parameters (622) in FIG. 4B. After updating the uncertainty parameters, technique 600 continues with decision block 632 of FIG. 4A.

In the example of FIG. 4A, technique 600 further includes determining, by the one or more processors, if the range bin is the last range bin (decision block 632). If "NO" at decision block 626, technique 600 further includes retrieving, by the one or more processors, the next range bin and considering the next range bin by determining a first signal power measurement based on Doppler processing of the next range bin, a second signal power measurement based on non-Doppler processing of the next range bin, and determining a quality of the first signal power measurement (634). Technique 600 further includes determining the locations within the three-dimensional buffer that correspond to the retrieved next range bin and the antenna beam pointing direction (612). Technique 600 further includes determining whether the quality of the first signal power measurement of a range bin (e.g., the next range bin) is above a threshold (614). If the quality of the first signal power measurement is above a threshold ("YES" at decision block 614), then technique 600 continues in FIG. 4B. If the quality of the first signal power measurement is below a threshold ("NO" at decision block 614), then technique 600 continues in FIG. 4C.

In the example of FIG. 4A, technique 600 further includes determining, by the one or more processors, if the range bin is the last range bin (decision block 632). If "YES" at decision block 632, technique 600 further includes pointing, by the radar system, the antenna at the next pointing angle (636), transmitting, by the radar system, radar signal 62 comprising a waveform and a plurality of coherent pulses, receiving, by the radar system, radar return signal 64, and sampling, by one or more processors (e.g., one or more processors 42 as described in FIG. 2), the radar return signal at a periodic rate, the timing of the periodic rate following transmission of radar signal 62 corresponds to a range bin (606).

The techniques of this disclosure may be implemented in a device or article of manufacture comprising a computer-readable storage medium. The term "processor," as used herein may refer to any of the foregoing structure or any other structure suitable for processing program code and/or data or otherwise implementing the techniques described herein. Elements of weather radar system 30 and/or processors 42 thereof, and/or system elements for executing and/or storing techniques or features thereof as disclosed above, may be implemented in any of a variety of types of solid state circuit elements, such as central processing units (CPUs), digital signal processors (DSPs), application-specific integrated circuits (ASICs), a magnetic nonvolatile random-access memory (RAM) or other types of memory, a mixed-signal integrated circuit, a field programmable gate array (FPGA), a microcontroller, a programmable logic controller (PLC), a system on a chip (SoC), a subsection of any of the above, an interconnected or distributed combination of any of the above, or any other integrated or discrete logic circuitry, or any other type of component or one or more components capable of being configured in accordance with any of the examples disclosed herein. One or more memory devices 46 may include any volatile or non-volatile media, such as a RAM, ROM, non-volatile RAM (NVRAM), electrically erasable programmable ROM (EEPROM), flash memory, and the like. One or more memory devices 46 may store computer readable instructions that, when executed by one or more processors 42, cause the one or more processors 42 to implement the techniques attributed to weather radar system 30 herein.

Elements of weather radar system 30 may be programmed with various forms of software. Weather radar system 30 may be implemented at least in part as, or include, one or more executable applications, application modules, libraries, classes, methods, objects, routines, subroutines, firmware, and/or embedded code, for example. Elements of weather radar system 30 as in any of the examples herein may be implemented as a device, a system, an apparatus, and may embody or implement a method of estimating reflectivity values based on Doppler and/or non-Doppler processing of a radar return signal, including implementing example techniques 500 and/or 600 as described with reference to FIGS. 3 and 4.

The techniques of this disclosure may be implemented in a wide variety of computing devices. Any components, modules or units have been described provided to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

Aircraft weather radar system 30 may be implemented on any type of aircraft or may be implemented on any type of ground-based weather radar system. An "aircraft" as described and claimed herein may include any fixed-wing or rotary-wing aircraft, airship (e.g., dirigible or blimp buoyed by helium or other lighter-than-air gas), suborbital spaceplane, spacecraft, expendable or reusable launch vehicle or launch vehicle stage, or other type of flying device. An "aircraft" as described and claimed herein may include any crewed or uncrewed craft (e.g., uncrewed aerial vehicle (UAV), flying robot, or automated cargo or parcel delivery craft). While some examples are described in terms of weather radar system 30 determining graphical weather radar outputs to weather radar graphical display device 44 for graphical display for a pilot, in other examples, weather radar system 30 may communicate updated weather radar outputs to another system, component, device, software module, computer, or other feature. For example, in an automated navigation system or in an uncrewed aircraft that may not include a graphical radar display, weather radar system 30 may communicate processed weather radar outputs to a software module, computer, embedded circuit, or other feature that performs automated navigation. In these examples, weather radar system 30 may generate outputs that may enable an automatic software-based navigation and/or piloting system to make decisions based on accurate and high-resolution characterization of convective weather structures and ground structures.

Various illustrative aspects of the disclosure are described above. These and other aspects are within the scope of the following claims.

What is claimed is:

1. A weather radar system comprising:
one or more antennas, wherein the one or more antennas are configured to:
    transmit a radar signal generated by a transmitter; and
    deliver a radar return signal of the transmitted radar signal to a receiver;
and
one or more processors configured to:
    sample the radar return signal at a periodic sample rate, wherein timing of the periodic sample rate following transmission of the radar signal corresponds to a range bin;
    determine a first signal power measurement of the sampled radar return signal of the first range bin based on Doppler signal processing, wherein the first signal power measurement comprises at least one of a ground signal power component or a weather signal power component;
    determine a quality of the first signal power measurement;
    responsive to determining that the quality of the first signal power measurement is above a threshold, estimate reflectivity values of the sampled radar return signal of the first range bin based on the first signal power measurement; and
    responsive to determining that the quality of the first signal power measurement is below the threshold:
        determine a second signal power measurement of the sampled radar return signal of the first range bin based on non-Doppler signal processing; and
        estimate reflectivity values of the sampled radar return signal of the first range bin based on the second signal power measurement; and
memory, wherein the memory is configured to store the estimated reflectivity values.

2. The weather radar system of claim 1, wherein the one or more processors are configured to estimate reflectivity values of the sampled radar return signal by at least being configured to separately estimate the ground reflectivity values based on the ground signal power component and weather reflectivity values based on the weather signal power component.

3. The weather radar system of claim 1, wherein the memory is configured to store a data structure, wherein the data structure comprises a three-dimensional (3-D) volumetric buffer defining a distribution of reflectivities, and wherein the one or more processors are further configured to update a portion of the data structure with the estimated reflectivity values.

4. The weather radar system of claim 3, wherein the one or more processors are configured to update the portion of the data structure with the estimated reflectivity values by at least being configured to update the portion of the data structure with at least one of estimated ground reflectivity values or estimated weather reflectivity values.

5. The weather radar system of claim 1, wherein the memory is configured to store a data structure, wherein the data structure comprises a three-dimensional (3-D) volumetric buffer defining a distribution of reflectivities, and wherein the one or more processors are further configured to update a portion of the data structure with the estimated reflectivity values based on the second signal power measurement.

6. The weather radar system of claim 1, wherein the one or more processors are configured to determine the quality of the first signal power measurement by at least being configured to determine whether the sampled radar return signal of the first range bin is at least partially eclipsed.

7. The weather radar system of claim 1, wherein the one or more processors are configured to determine the quality of the first signal power measurement by at least being configured to determine amount of multiple-time-around echo (MTAE) contamination associated with the sampled radar return signal of the first range bin.

8. The weather radar system of claim 1, wherein the one or more processors are configured to determine the first signal power measurement based on Doppler signal processing by at least being configured to measure at least one of:
    ground signal power,
    weather signal power,
    receiver noise power, or
    MTAE power.

9. The weather radar system of claim 1, wherein the one or more processors are configured to determine the second signal power measurement of the sampled radar return signal of the first range bin based on non-Doppler signal processing by at least being configured to measure the sum of ground signal power, weather signal power, and receiver noise power of the sampled radar return signal of the first range bin.

10. A method comprising:
transmitting, by one or more antennas, a plurality of radar signals generated by a transmitter;
delivering, by the one or more antennas, a plurality of radar return signals of the transmitted radar signals to a receiver;
sampling, by one or more processors, plurality of radar return signals at a periodic sample rate to generate a first sampled radar return signal and a second sampled radar return signal, wherein timing of the periodic sample rate following transmission of the plurality of radar signals corresponds to a range bin;
determining, by the one or more processors, a first signal power measurement of the first sampled radar return signal of a first range bin based on Doppler signal processing, wherein the first signal power measurement of the first sampled radar return signal comprises at least one of a ground signal power component or a weather signal power component;
determining, by the one or more processors, a quality of the first signal power measurement of the first sampled radar return signal;
responsive to determining that the quality of the first signal power measurement of the first sampled radar return signal is above a threshold, estimating, by the one or more processors, reflectivity values of the first sampled radar return signal of the first range bin based on the first signal power measurement;
determining, by the one or more processors, a first signal power measurement of the second sampled radar return signal of the first range bin based on Doppler signal processing;
determining, by the one or more processors, a quality of the first signal power measurement of the second sampled radar return signal; and responsive to determining that the quality of the first signal power measurement of the second sampled radar return signal is below the threshold:
   determine a second signal power measurement of the second sampled radar return signal of the first range bin based on non-Doppler signal processing; and
   estimating, by the one or more processors, reflectivity values of the second sampled radar return signal based on the second signal power measurement.

11. The method of claim 10, wherein estimating reflectivity values of the first sampled radar return signal comprises separately estimating, by the one or more processors, ground reflectivity values based on the ground signal power component and weather reflectivity values based on the weather signal power component.

12. The method of claim 10, further comprising updating, by the one or more processors, a portion of a data structure stored in memory with the estimated reflectivity values of the first sampled radar return signal, wherein the data structure comprises a three-dimensional (3-D) volumetric buffer, and wherein the 3-D volumetric buffer defines a distribution of reflectivities.

13. The method of claim 12, wherein updating the portion of the data structure stored in memory with the estimated reflectivity values of the first sampled radar return signal comprises updating, by the one or more processors, the portion of the data structure with at least one of estimated ground reflectivity values or estimated weather reflectivity values.

14. The method of claim 10, further comprising updating, by the one or more processors, a portion of a data structure stored in memory with the estimated reflectivity values based on the second signal power measurement of the second sampled radar return signal, wherein the data structure comprises a three-dimensional (3-D) volumetric buffer, and wherein the 3-D volumetric buffer defines a distribution of reflectivities.

15. The method of claim 10, wherein determining the quality of the first signal power measurement of the first sampled radar return signal comprises determining, by the one or more processors, whether the sampled radar return signal of the first range bin is at least partially eclipsed.

16. The method of claim 10, wherein determining the quality of the first signal power measurement of the first sampled radar return signal comprises determining, by the one or more processors, an amount of multiple-time-around echo (MTAE) contamination associated with the sampled radar return signal of the first range bin.

17. A non-transitory computer-readable medium storing instructions that when executed by one or more processors cause the one or more processors to:
   sample a radar return signal at a periodic sample rate, wherein timing of the periodic sample rate following transmission of the radar signal corresponds to a range bin;
   determine a first signal power measurement of the sampled radar return signal of the first range bin based on Doppler signal processing, wherein the first signal power measurement comprises at least one of a ground signal power component or a weather signal power component;
   determine a quality of the first signal power measurement;
   responsive to determining that the quality of the first signal power measurement is above a threshold, estimate reflectivity values of the sampled radar return signal of the first range bin based on the first signal power measurement; and
   responsive to determining that the quality of the first signal power measurement is below the threshold:
      determine a second signal power measurement of the sampled radar return signal of the first range bin based on non-Doppler signal processing; and
      estimate reflectivity values of the sampled radar return signal of the first range bin based on the second signal power measurement.

18. The non-transitory computer-readable medium of claim 17, storing further instructions that when executed cause the one or more processors to:
   update a portion of a data structure stored in memory with the estimated reflectivity values.

* * * * *